United States Patent
Breit et al.

(10) Patent No.: US 7,550,866 B2
(45) Date of Patent: Jun. 23, 2009

(54) VEHICULAR POWER DISTRIBUTION SYSTEM AND METHOD

(75) Inventors: Joseph S. Breit, Bellevue, WA (US); Joanna A. Szydlo-Moore, Everett, WA (US); Kurt Lorhammer, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 324 days.

(21) Appl. No.: 11/613,634

(22) Filed: Dec. 20, 2006

(65) Prior Publication Data

US 2008/0150356 A1    Jun. 26, 2008

(51) Int. Cl.
*B60L 1/00* (2006.01)
(52) U.S. Cl. ........................................ 307/9.1
(58) Field of Classification Search ............ 307/9.1
See application file for complete search history.

(56) References Cited

U.S. PATENT DOCUMENTS 6,664,656 B2    12/2003    Bernier 6,778,414 B2 *   8/2004   Chang et al. .................. 363/67

OTHER PUBLICATIONS

Luiz Andrade and Carl Tenning; *Design of the Boeing 777 Electric System*; Proceedings of the IEEE 1992 National Aerospace and Electronics Conference; May 18-22, 1992; pp. 1281-1290; vol. 3; IEEE.

* cited by examiner

*Primary Examiner*—Robert L. Deberadinis
(74) *Attorney, Agent, or Firm*—Alston & Bird LLP

(57) ABSTRACT

A power distribution system for a vehicle is provided. The power distribution system includes a network incorporating at least one load. At least a first and a second power source are connected to the network. The first power source is located and connected proximal to the load and the second power source is located distal from the load. A generator may be connected to the network distally from the first and second loads and configured to supply power to at least one of the first and second loads. The generator may be configured such that power is supplied selectively when power from at least one of the first and second power sources is less than respectively required by the first and second loads. The first and second power sources may be configured to be regenerated by the generator. The network may include more highly power-rated components in areas configured for higher power transmission and more lowly power-rated components in areas configured for lower power transmission.

23 Claims, 11 Drawing Sheets

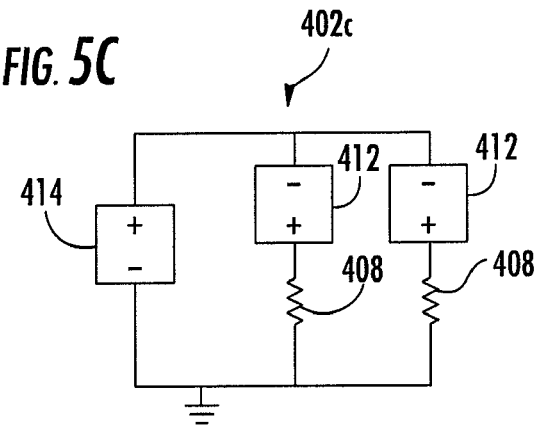
FIG. 5C
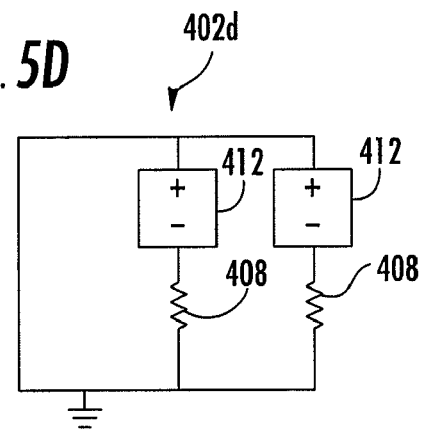
FIG. 5D
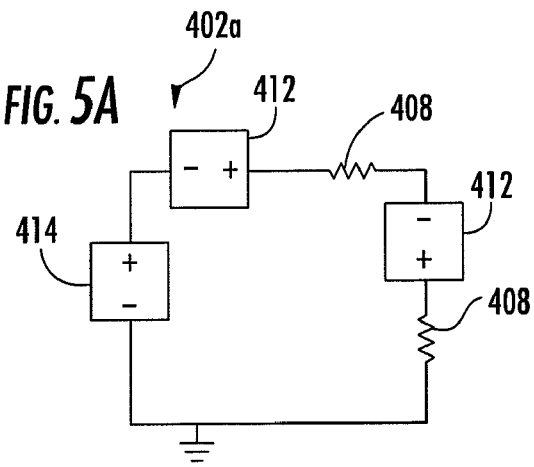
FIG. 5A
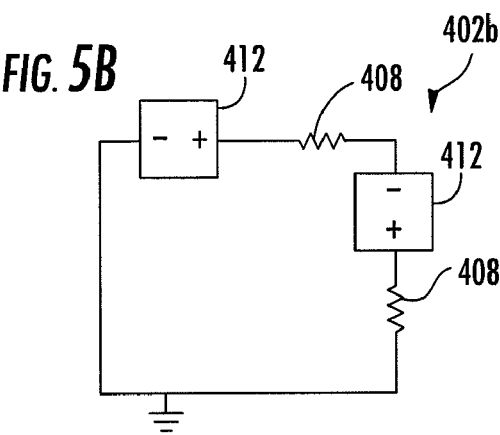
FIG. 5B
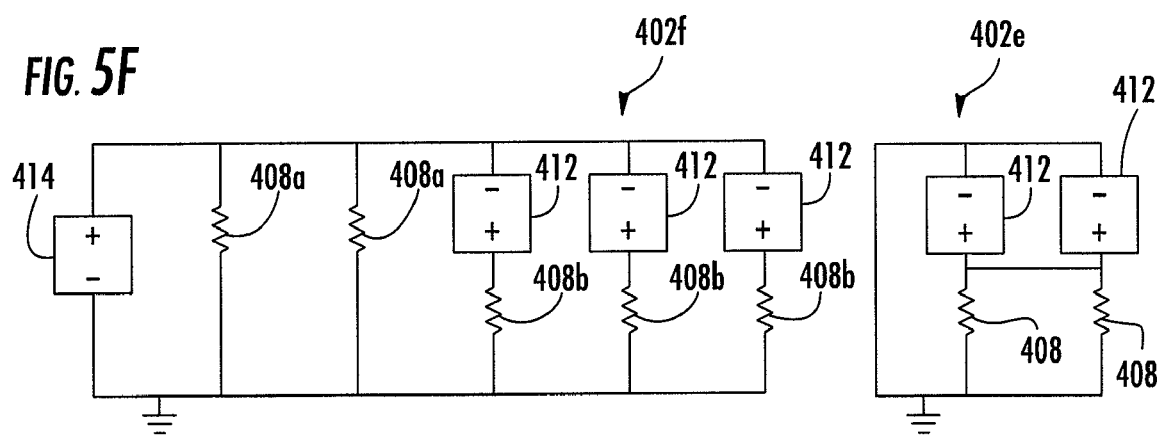
FIG. 5F
FIG. 5E

VEHICULAR POWER DISTRIBUTION SYSTEM AND METHOD

FIELD OF THE INVENTION

Embodiments of the present invention are related to methods and systems for power distribution, and more particularly to methods and systems for distributing power in a vehicle.

BACKGROUND OF THE INVENTION

Various vehicles, such as automobiles, aircraft, and maritime vessels, may include power distribution systems for generating and distributing power, often electrical, to various loads included onboard the vehicle. In the case of an aircraft, loads commonly found in the power distribution system include the flight controls, avionics, galley ovens, heaters and refrigeration units, lighting, fans, de-ice and anti-ice, etc. Typically, the power distributed to the loads by these systems is generated via an engine that is utilized both to propel the vehicle and to drive a generator. As such, the power generated by the engine must be allocated between electrical power generation and vehicle propulsion activities (and as such, the engine/propulsion mechanisms can be thought of as another load on the system, although not electrical, further dissipating energy). It is therefore desirable to design electrical power generation and distribution systems so as to distribute power efficiently between the electrical power utilization and the vehicle propulsion.

More recently, aircraft designs have increased the use of electrical power onboard an airplane. For example, recent innovations include an electrical starter-generator, which is used for engine starting and power generation, electrically powered environmental control and pressurization systems, electrical actuation (flight controls), and electrical anti-ice and de-ice systems. With the inclusion of these new loads, total electrical loading onboard an aircraft could be raised from around 100 kilowatt (kW) to around 1 megawatt (MW).

One of the factors contributing to the electrical losses on aircraft is the relatively long distance over which power typically must be transmitted before reaching loads and the concomitant power dissipation. As mentioned earlier, aircraft power generation is typically carried out by generators associated with engines. However, as illustrated in FIG. 1, the engines 18 in many conventional aircraft 1 are positioned on the wings 16, this positioning being dictated by and optimized for propulsion and aerodynamics considerations rather than electrical power distribution considerations. Because of the engine positioning, power generated by the generators 14, typically alternating current (AC) power, must travel the distance from the wings 16 across to the body of the airplane 10 where it is fed into an AC bus 20. This power is then converted to DC power, often by a rectifier 22, and fed to a DC bus 24 from which the power is distributed over the distance of the body 10 to loads 8 distributed therethrough. In all, the power is transmitted significant distances between the point of generation and the point of beneficial use. In so doing, a significant amount of power is dissipated via line losses, and this raises the amount of power that must be initially generated. There is a therefore a need in the art for a power distribution system in which power is used more efficiently and power dissipation through line losses is reduced. Further, transmission of relatively large amounts of power requires larger conductors and network components rated for higher power applications, which can disadvantageously increase weight and cost of the power distribution system. As such, there is a need in the art for a power distribution system that reduces the need for and/or use of high power conductors and components.

SUMMARY OF THE INVENTION

Embodiments of the present invention may address at least some of the above disadvantages and achieve still other advantages by providing an improved system and a method for distributing power in a vehicle. In this regard, power sources of the power distribution system are located and connected at points closer to loads of the power distribution system. In this way, some power from the power sources may be transmitted over relatively short distances before reaching and being utilized by the loads.

One aspect of the present invention is directed to a power distribution system for a vehicle. The power distribution system includes a network incorporating at least one load. At least a first and a second power source are connected to the network. The first power source is located and connected proximal to the load and the second power source is located distal from the load. At least one of the power sources may be a generation device, such as an electrical generator or one or more solar cells, or may be a storage device, such as a fuel cell, a battery, a capacitor, an ultra-capacitor, a turbine, a micro-turbine, an internal combustion engine, or a flywheel. The power sources may or may not be connected in parallel with each other. A generator may be connected to the network distally from the first and second loads and configured to supply power to at least one of the first and second loads. The generator may be configured such that power is supplied selectively when power from at least one of the first and second power sources is less than respectively required by the first and second loads. The first and second power sources may be configured to be regenerated by the generator. The network may include more highly power-rated components in areas configured for high power transmission and more lowly power-rated components in areas configured for low power transmission. The generator may be coupled to an engine, and at least one of the first and second power sources may supply power to the engine. The operation of the power distribution system may be monitored and/or controlled, to some extent, by an expert system that is coupled to the power distribution system.

In one embodiment, the power distribution system includes at least a first and second load. The second power source is located and connected proximal to a second load, and the first power source is located distal from the second load. Each of the first and second power sources may be independently connected to each of the first and second loads, and/or each of the first and second power sources may be connected in parallel to the first and second loads. Alternatively, the first or second power sources may be connected in series with the first and second loads, and/or in series with one another. In another embodiment, the first and second power sources may be configured to selectively supply at least some power to the network. In yet another embodiment, the network includes a plurality of loads, the power sources include a plurality of power sources interconnected to form a power source network, and multiple electrical connections exist between the power source network and the network such that at least one load of the plurality of loads is configured to be supplied by multiple power sources.

Another aspect of the present invention is directed to a power distribution system for a vehicle. The power distribution system includes a network including at least first and second loads. At least a first and a second power source are connected to the network. The first power source is located proximal to the first load and the second power source is located proximal to the second load. Each of the first and second power sources may be configured to supply power in parallel to the first and second loads.

Another aspect of the present invention is directed to an air vehicle. The air vehicle includes an air vehicle structure including an elongated body and at least one wing extending laterally from the body. A network for distributing power within at least part of the body is also included, the network incorporating one or more loads distributed within the body. One or more power sources are located in the body and connected to the network with multiple of the loads.

Another aspect of the present invention is directed to a method of powering an air vehicle. The method includes providing an air vehicle having an air vehicle structure including an elongated body and at least one wing extending laterally from the body. A network for distributing power within at least part of the body is also provided, the network including one or more loads distributed within the body. At least one generator is located in the wing and connected to the network. One or more storage devices are connected to the network. At least some of the storage devices are located and connected proximally to at least a respective one of the loads and are connected in parallel with multiple loads. When generator output is less than demand requirements of the loads, power is supplied from the storage devices. When generator output is greater than demand requirements of the load, power is supplied from the generator. At least one of the storage devices is regenerated when the generator is supplying power.

BRIEF DESCRIPTION OF THE DRAWINGS

Figure 1:
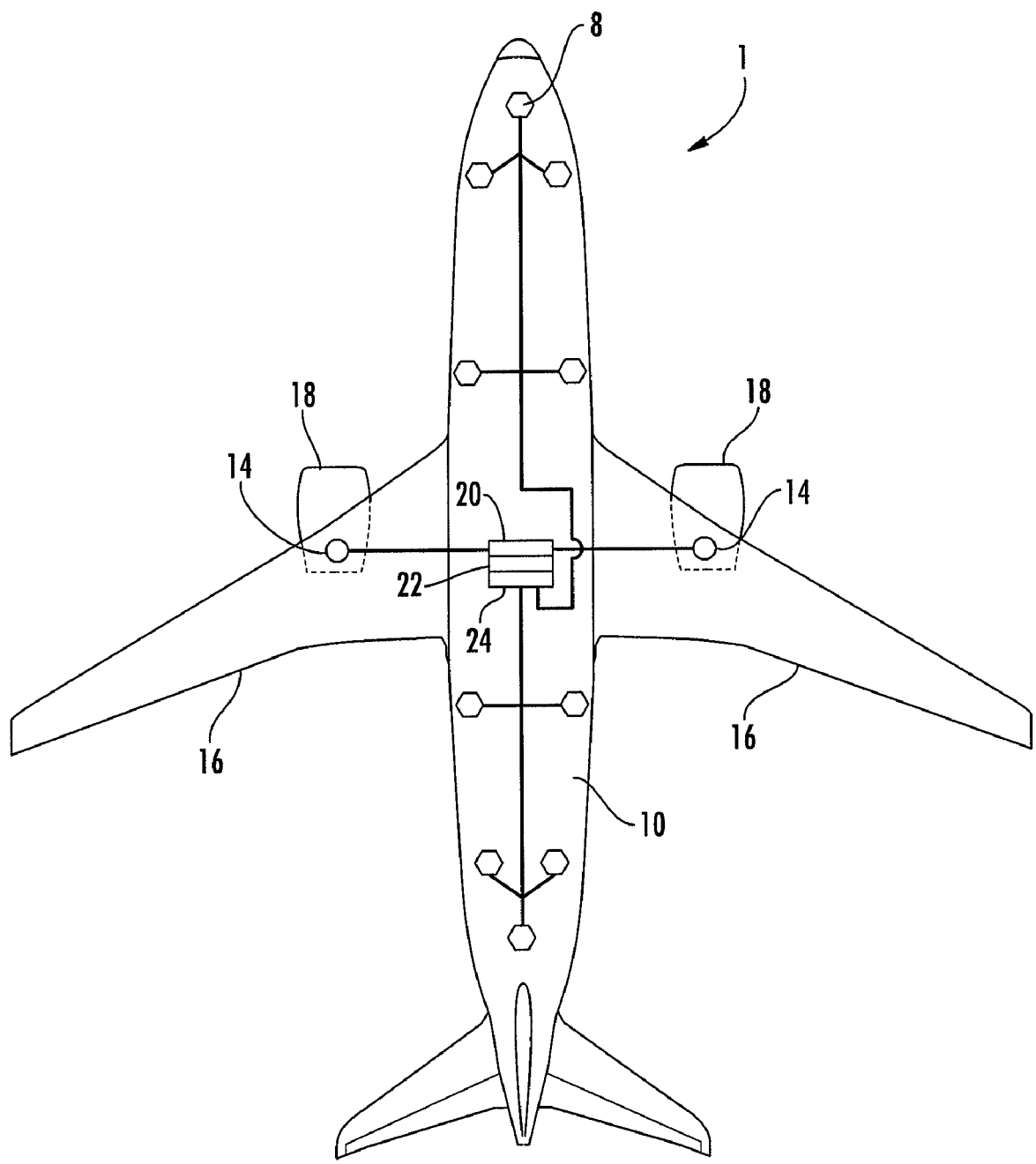
Figure 2:
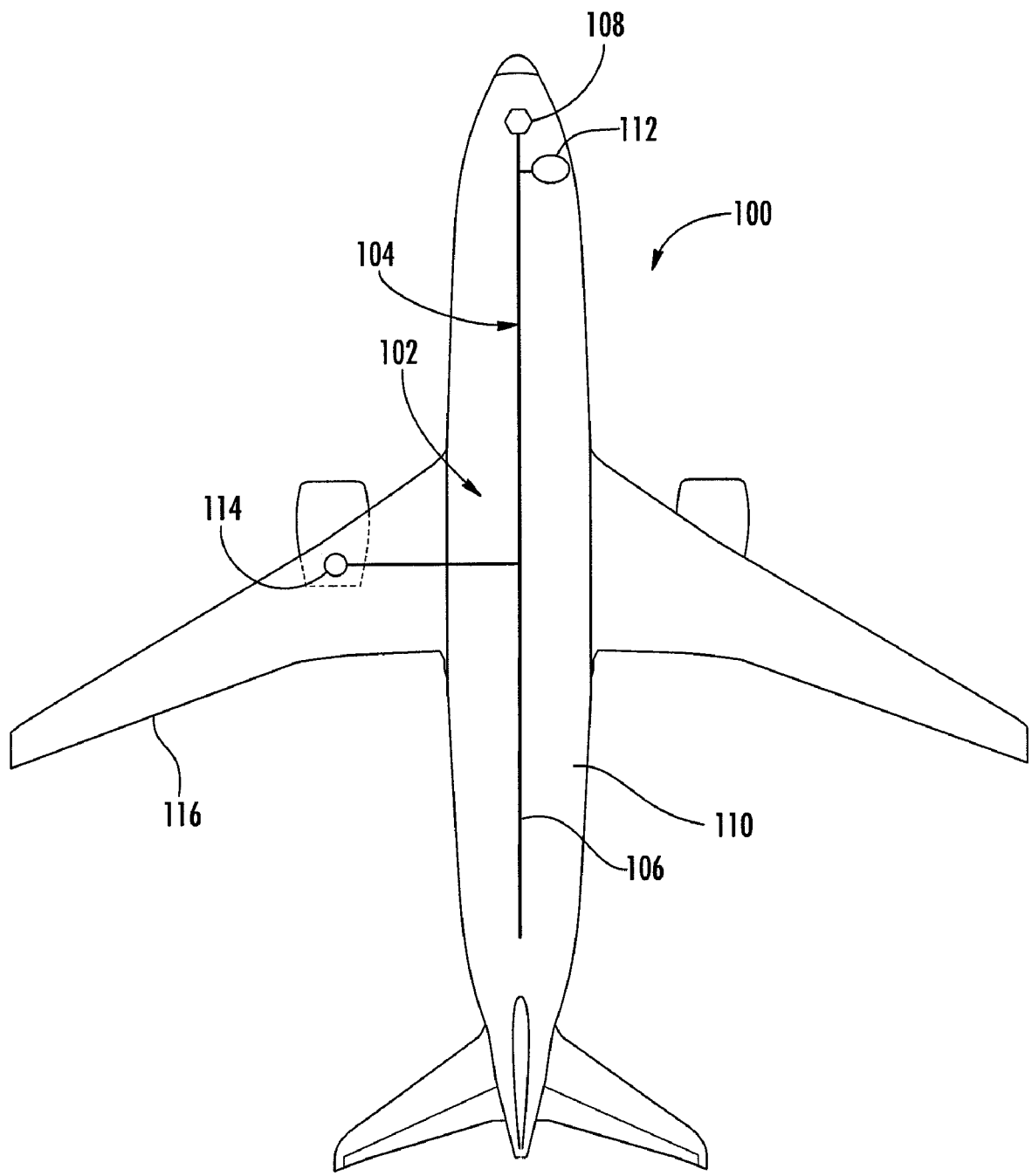
Figure 3:
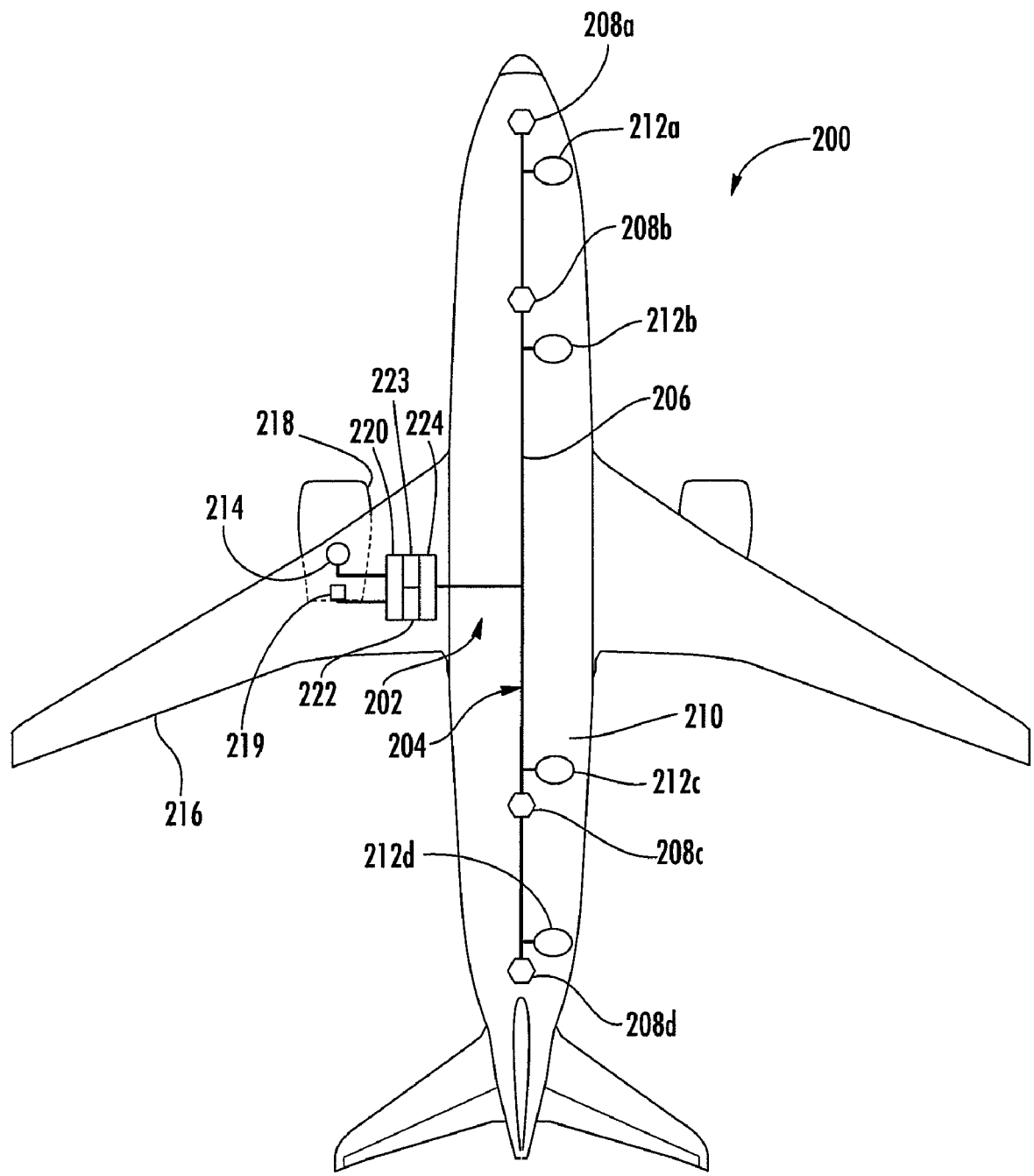
Figure 4A:
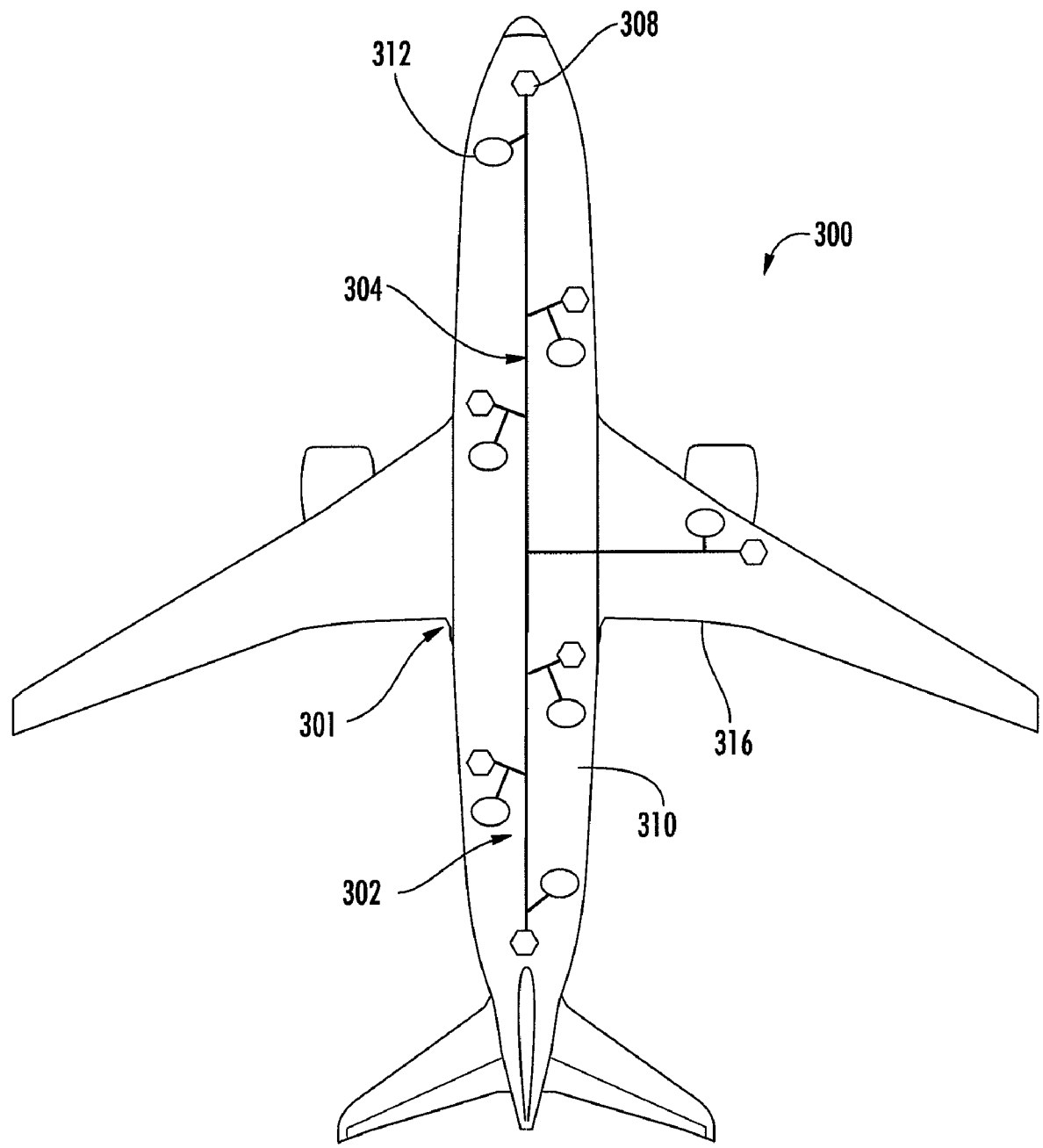
Figure 4B:
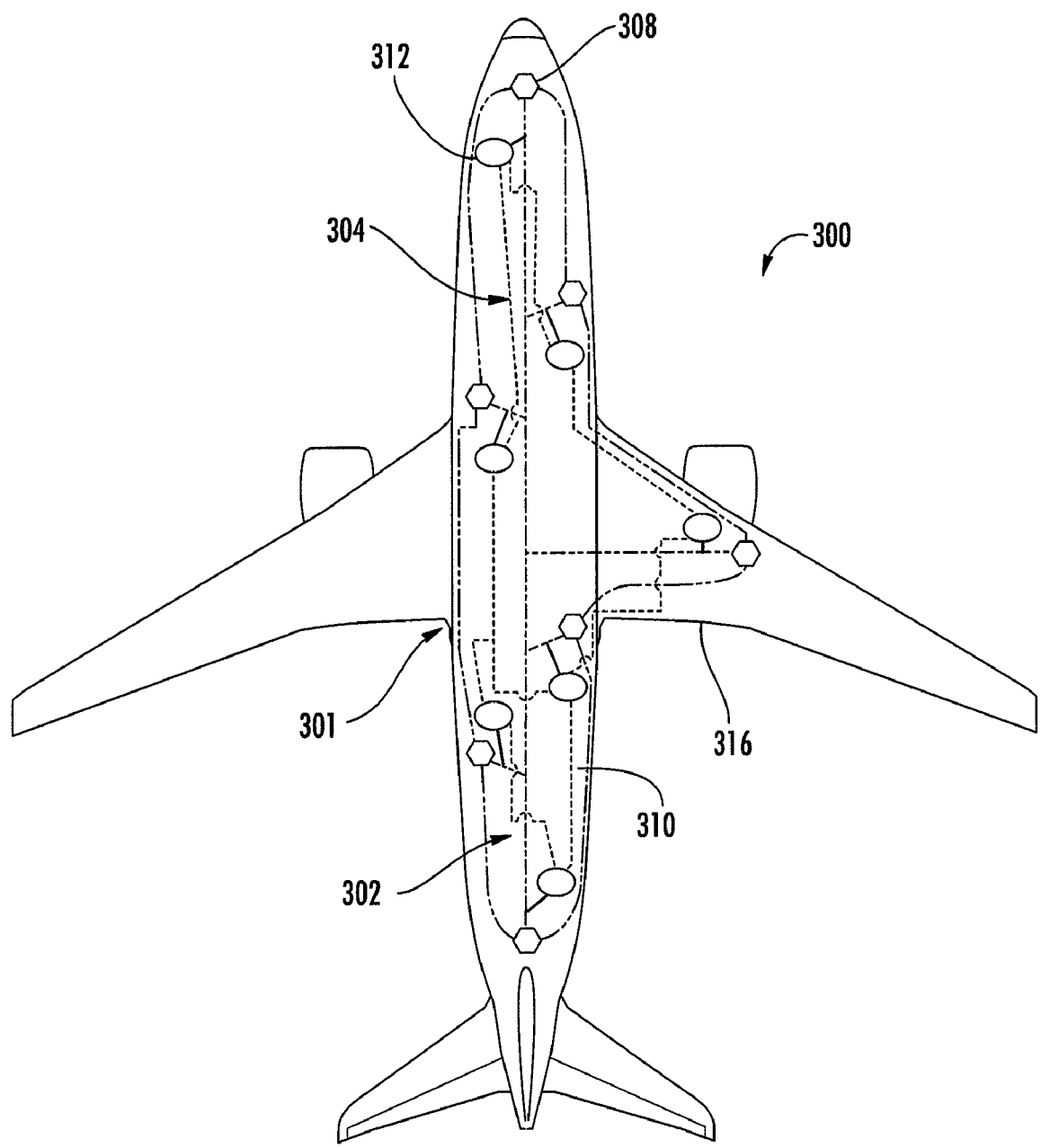
Figure 5G:
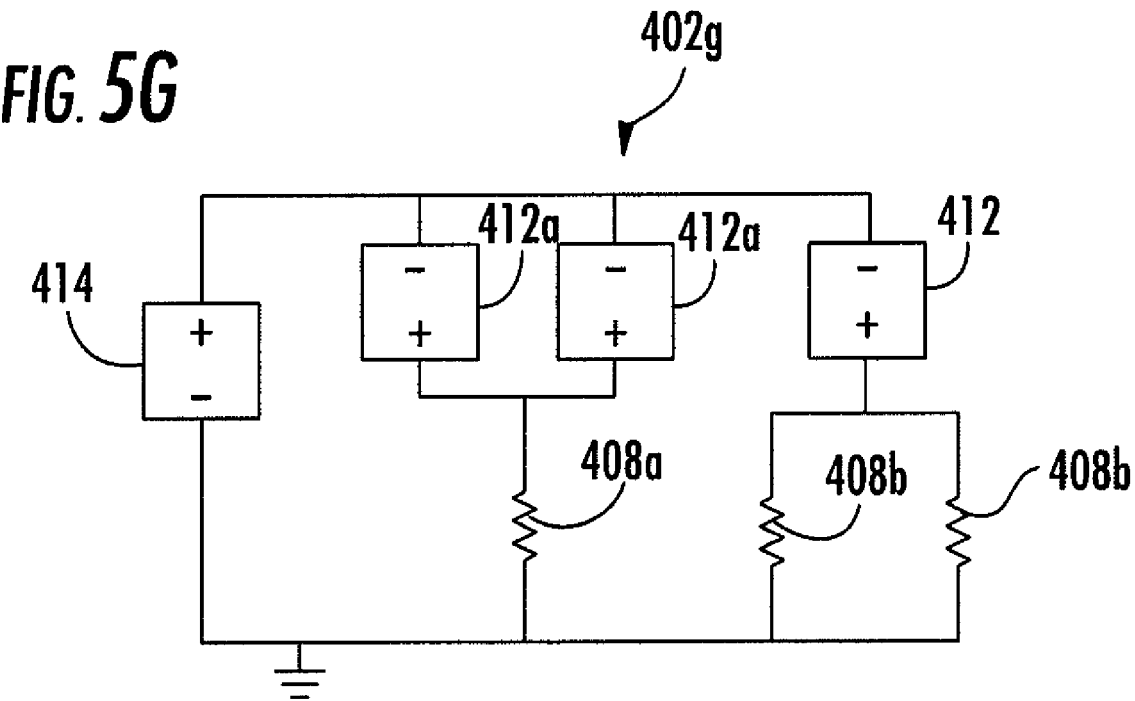
Figure 5H:
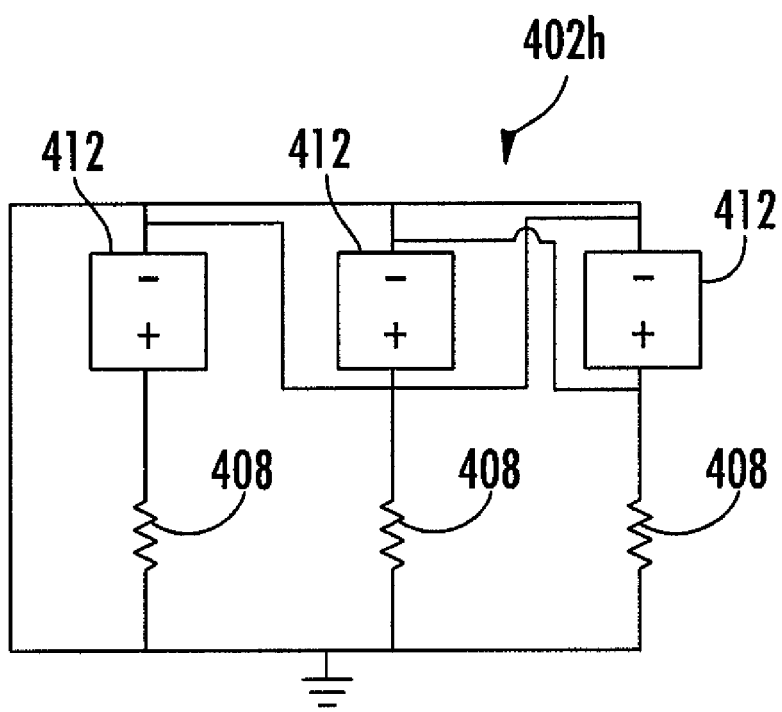
Figure 6:
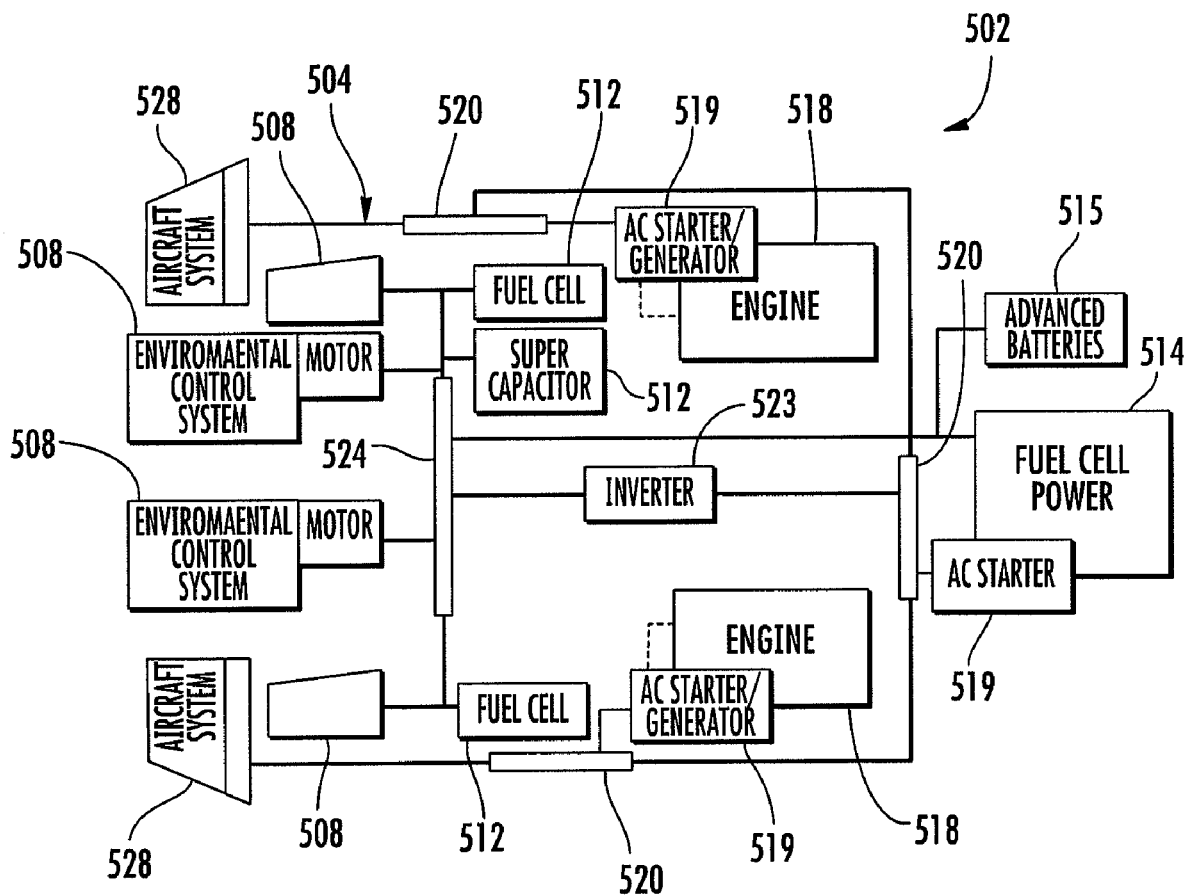
Figure 7:
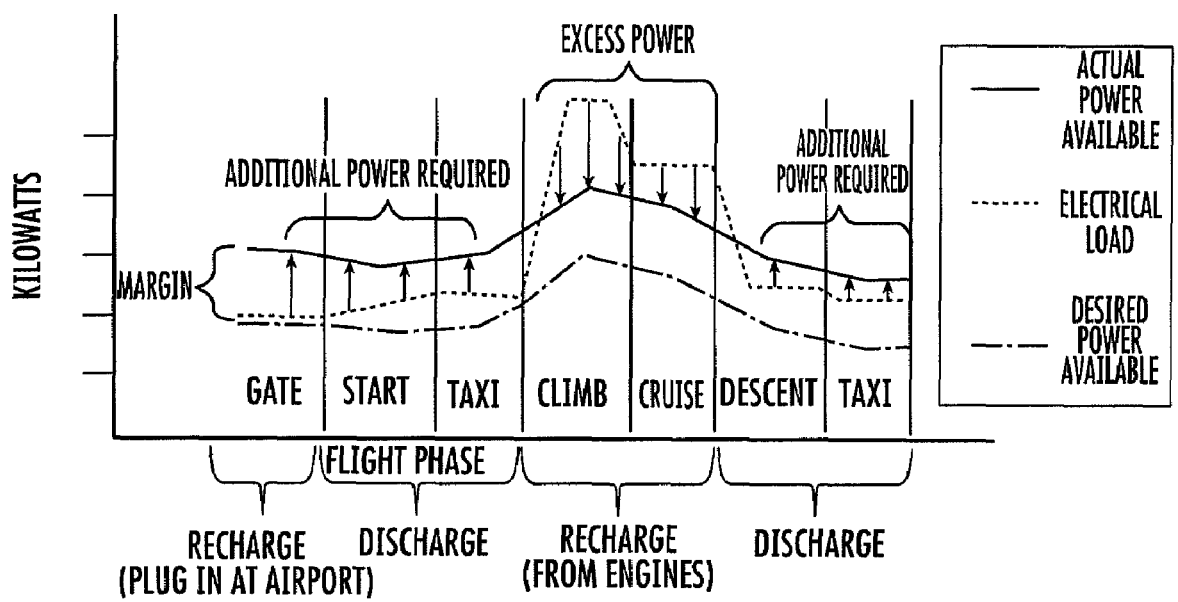

Having thus described the invention in general terms, reference will now be made to the accompanying drawings, which are not necessarily drawn to scale, and wherein:

FIG. 1 is a schematic illustration of a conventional aircraft and associated power distribution system;

FIG. 2 is a schematic illustration of an airplane including a power distribution system, the airplane and power distribution system constructed in accordance with an embodiment of the present invention;

FIG. 3 is a schematic illustration of an airplane including a power distribution system, the airplane and power distribution system constructed in accordance with another embodiment of the present invention in which the power distribution system incorporates elements of contemporary power distribution systems;

FIGS. 4a and 4b is a schematic illustration of an airplane including a power distribution system, the airplane and power distribution system constructed in accordance with yet another embodiment of the present invention;

FIGS. 5a-5h are circuit diagrams representing power distribution systems constructed in accordance with embodiments of the present invention, the circuit diagrams illustrating some of the variety of ways in which power sources and loads may be interconnected;

FIG. 6 is a block diagram of a power distribution system configured in accordance with an embodiment of the present invention;

FIG. 7 is a graph of electrical load and available engine power for a contemporary aircraft, indicating instances where excess engine power might be utilized to regenerate storage devices.

Figure 8:
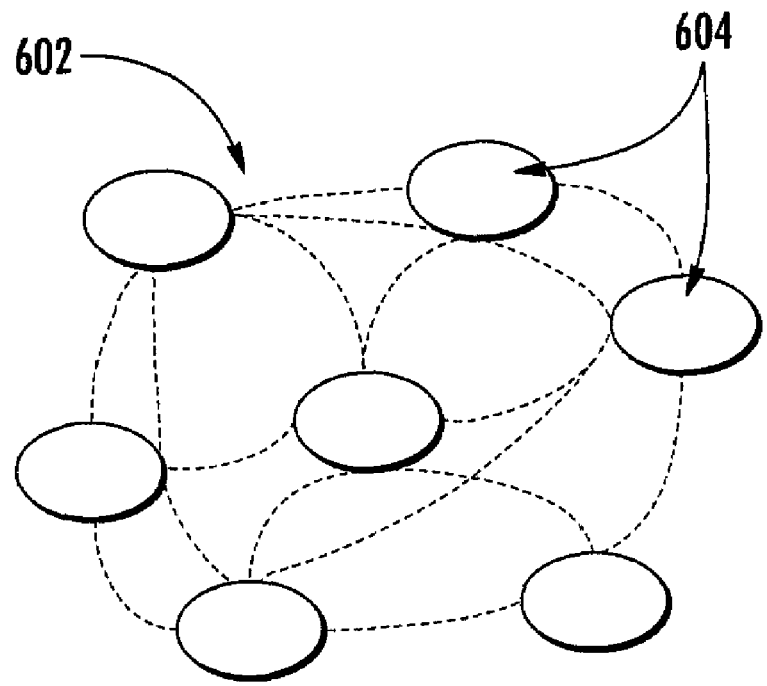
Figure 9:
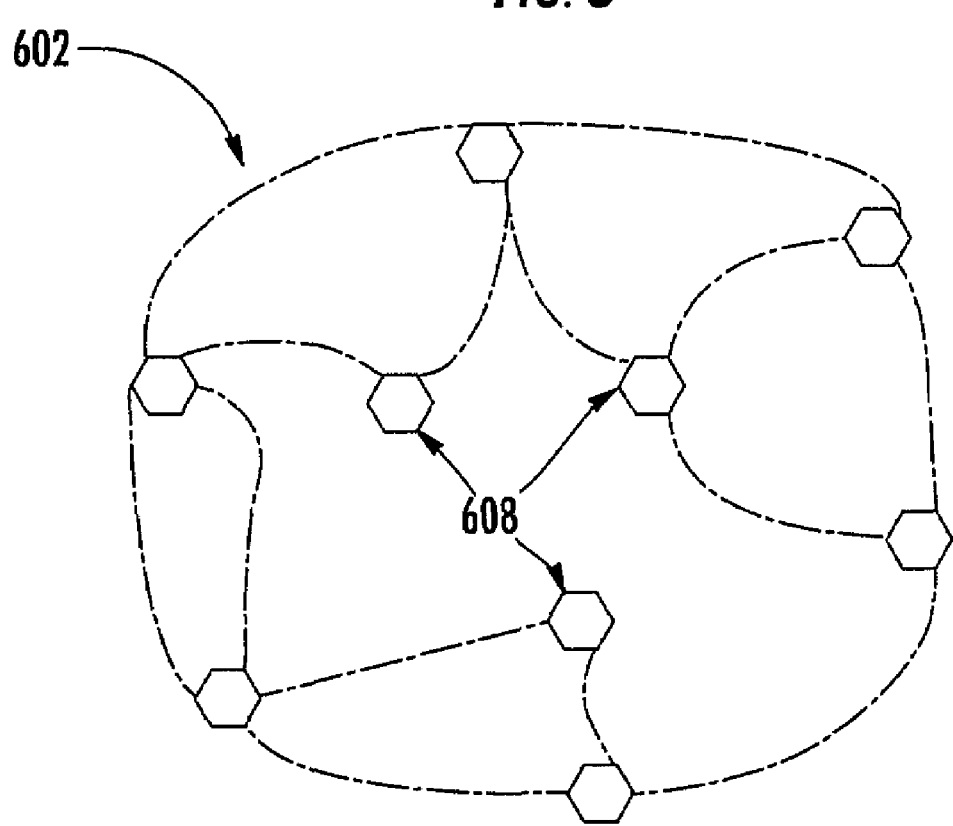

FIG. 8 is a schematic illustration of a network of power sources;

FIG. 9 is a schematic illustration of a network of electrical loads; and

Figure 10:
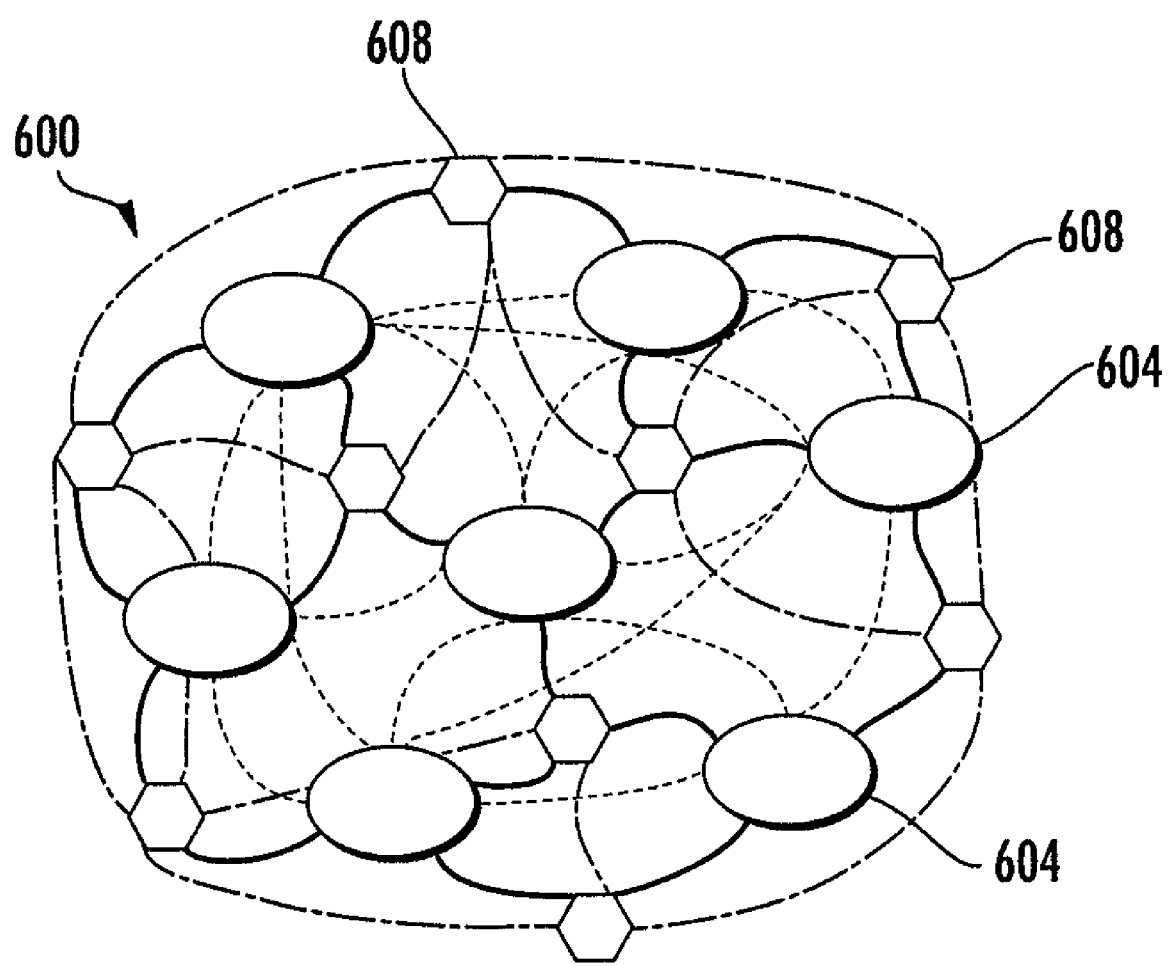

FIG. 10 is a schematic illustration of a power distribution system incorporating the network of power sources of FIG. 8 and the network of electrical loads of FIG. 9.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 2, therein is shown a vehicle, specifically an airplane 100 including a power distribution system 102 constructed in accordance with an embodiment of the present invention. The power distribution system 102 includes a network 104, in this case a network of wires or other conductors 106 extending through the body 110 of the airplane 100 and connected to a load 108. Load 108 could be, for example, avionics, galleys, fans, etc., or could be a group of such loads interconnected to form a network of loads that may be connected in series, in parallel, or some combination, and may be multiply or redundantly connected within the network. A first power source 112 may be part of the distribution system, for example, connected to network 104 proximally to load 108. More specifically, power source 112 may be both spatially close to load 108 and connected to network 104 at a point close to load 108. In this way, power emitted by power source 112 may follow a short path in reaching load 108. A second power source, in this case a generator 114, is located distally from load 108. For example, generator 114 can be located in a wing 116 of airplane 100.

When assembled as shown in FIG. 2, both power sources 112, 114 may be capable of supplying power to load 108, either together or independently, in parallel or in series with one another, or via simultaneous series and parallel connections. Power travels along wires 106 of network 104 in order to reach load 108. The amount of power dissipated during transmission is a function of, amongst other things, the amount of power being transmitted and the distance that power must travel before being utilized. By placing a source of power 112 close to the load 108, the amount of power dissipated before being utilized may be reduced as compared to a system in which power sources were located farther from the loads. It is noted that the terms "close to" and "farther from," along with the previously used terms "proximal" and distal," are relative terms. Generally, use of these terms denotes some significant spacing of components so described, such as on the order of, e.g., several feet or meters.

Each of the power sources 112, 114 may be either a generation device or a storage device; there is no requirement that the power sources are of the same type of device. Potential types of storage devices include fuel cells, batteries, flywheels, and/or capacitors/ultra-capacitors. Possible generation devices include turbines/micro-turbines, electrical generators, and/or one or more solar cells. Also, while the above system has been described with respect to two power sources, it is readily expanded to many power sources as may be desired for a particular application, each of which may be connected in parallel and/or in series with each of the other sources and each of the loads.

FIG. 3 shows an airplane 200 including and representing an embodiment of the present invention in which a power distribution system 202 incorporates some features of power distribution architecture in contemporary aircraft. The power distribution system 202 includes a network 204 in which wires 206 interconnect a series of loads 208a-d distributed through the body 210 of the airplane 200. Multiple power sources 212a-d are connected to the network, each source 212a-d being located and connected relatively close to a respective load 208a-d and relatively farther from other loads.

A generator 214 is located in a wing 216 of airplane 200, in or near an engine 218 as discussed previously, for supplying power to one or more of the loads. Often, engine-driven generators produce AC power, and the system 202 includes a component, such as a rectifier 222, that may receive AC power from AC bus 220 and convert the AC power to DC power appropriate for distribution to DC bus 224 and throughout much of the network 204. Alternatively, some components, such as a starter 219 for a contemporary aircraft engine, require AC power. Inclusion of a component, such as an inverter 223, for converting DC power to AC power allows power sources 212a-d to provide AC power to starter 219. In other embodiments, all of the components connected by network 204 may accept AC power, and the power sources 212a-d would then be configured either to output AC power or would output DC power that was converted to AC power.

As also discussed previously, the engine/generator position may be constrained to the wing or tail based on requirements related to enabling flight of the aircraft. The electrical path from the generator to the loads in the body of the plane is therefore necessarily relatively long. Placing the power sources 212a-d in closer proximity to the loads reduces the amount of total power that must be transmitted from the somewhat remotely located generator, thereby potentially increasing the efficiency of the power distribution system. Some of the power sources 212a-d may supply power to some of the loads 208a-d in parallel, in series, or both, and some of the power sources may be connected to one another in parallel or in series. In one embodiment, all of the power sources are connected in parallel to all of the loads. It is noted that, while much of the description focuses on the transmission of power to loads distributed around the airplane, either from the multiple power sources or from the generators associated with the engines, power may also be transmitted from the multiple power sources to the engines, in order to aid with engine operation and/or aircraft propulsion.

Referring to FIGS. 4a and 4b, therein is shown an airplane 300 including a power distribution system 302 constructed in accordance with another embodiment of the present invention. Network 304 includes an interconnected series of loads 308 and multiple power sources 312. The network 304 may extend (and loads 308 may be placed) throughout the structure 301 of the airplane 300, including the body 310 and wings 316. Similar to the previously described embodiment, each source 312 is located and connected relatively close to a respective load 308 and relatively farther from other loads. The power sources 312 may tend to supply power disproportionately to some loads 308, and specifically to the respective load proximal to which the power source is connected and located. However, each of the sources 312 may be connected in parallel with some or all of the loads, in series with some or all of the loads, in parallel with some loads and in series with others, and/or configured so as not to supply power to some loads. Any number of interconnections can exist between the loads 308, between the power sources 312, and/or between loads 308 and power sources 312. As such, in one embodiment, the loads 308 and power sources 312 may form respective networks of loads and power sources that are then multiply interconnected. Notably, the system 302 may exclude a generator, as the power sources may fulfill the power requirements of the loads. Alternatively, system 302 may include a generator, which may at times supplement or replace power sources 312 as the source of power for loads 308. In other embodiments, power sources 312 may supply power to an engine of the aircraft in addition to loads 308.

As mentioned above, the power sources may supply power to the loads in a variety of ways. Referring to FIGS. 5a-5h, therein are shown circuit diagrams representing power distribution systems 402a-h in accordance with embodiments of the present invention. The circuit diagrams illustrate some of the variety of ways in which power sources and loads may be interconnected. These diagrams, while depicting single phase DC, are also meant to represent series and parallel AC connections. In some cases, a respective system may include power sources 412, 412a placed close to one or more loads 408 and power sources 414 placed distally from loads, while in other cases, all of the power sources 412, 412a may be proximal to loads. In systems 402a and 402b, all of the power sources 412, 414 are in series with each other and with loads 408. In system 402c, power source 414 is connected in parallel to loads 408, while power sources 412 are connected in series with respective loads 408. In system 402d, each of the power sources 412 is connected independently to respective loads 408, while in system 402e, each of power sources 412 is connected in parallel with both of loads 408. In system 402f, a power source 414 is connected in parallel to multiple loads 408a-b. Some loads 408a are configured to receive power only from source 414, while other loads 408b are configured to receive power from respective sources 412 in close proximity. In system 402g, power source 414 is connected in parallel to loads 408a-b. Power sources 412a are connected in parallel with one another and configured to provide power to relatively close load 408a, while power source 412b is connected in parallel to loads 408b, each load 408b being in close proximity to source 412b. In system 402h, some power sources 412 are connected both in parallel and in series to some loads 408. It should be noted that any of the connection schemes exemplified in FIGS. 5a-5g can be combined with any of the other connection schemes exemplified in those same figures.

Referring to FIG. 6, therein is shown a block diagram of a power distribution system 502 configured in accordance with an embodiment of the present invention. The system 502 includes a network 504, part of which is powered by DC power and part of which is powered by AC power. The DC-powered portion of network 504 includes a DC bus 524 from which DC power may be transmitted to loads. A power source, in this case an auxiliary fuel cell 514 and an advanced battery 515, such as a lithium-polymer battery, supplies DC power to the bus 524. Power sources 512, including fuel cells, super-capacitors, and batteries, are located and connected to network 504 at points close to loads 508, including a window heating unit, an anti-ice unit, and environmental control systems. An inverter 523 connects the DC portion of the network to the AC portion of the network, thereby allowing DC sources 512 to transmit AC power to devices requiring AC power and connected to the AC bus 520. These devices include the starter 519 and aircraft systems 528, such as the fuel system, the flight control system, and/or the environmental control system. A generator may be included, for example, integrated with starter 519, and turned by engine 518 to supply either primary or supplemental power to system 502 via AC bus 520. Power may also be supplied to engine 518 by power sources 512, possibly via DC bus 524, inverter 523, and AC bus 520.

As demonstrated by the above described embodiments, the power sources may be used either to supplement the power provided by the generator, to render the generator as a secondary or backup power source, or to eliminate the need for a generator altogether. In cases where the power sources serve to supplement the generator, this can be done continuously, or one or more of the power sources can be configured to selectively supply power to the network. For example, in cases where the power demand of a load is variable over time, the generator can be used to supply power to the load during periods of minimal power requirements, and the power sources can supply power, possibly in addition to the generator, when demand rises above those minimum levels. The power sources may include controls that detect the demand of one or more loads and initiate the supply of power from the power sources. Alternatively, or in addition, the power distribution system may include expert systems for controlling and monitoring the power distribution system. The expert systems may include one or more interfaces for sensing power distribution system performance and one or more computers that analyze such performance. The expert systems may further include switches, relays, and the like that allow electrical connections to be selectively established when necessary in order to optimize the performance of the power distribution system. When the generator is used as a backup power source, it may be configured to selectively supply power only at times when needed, and only in the amounts by which supply from the other power sources falls short of the power demand of the loads. Further, as mentioned earlier, the power sources can be used, perhaps selectively, to supply power to the propulsion systems of the aircraft, possibly as a supplement to power produced by an engine alone.

In some embodiments, the power sources may be configured to be regenerated by the generator. The generator (or other power source) may be used to regenerate the power supplying capabilities of one or more power sources, for example, in times when generator output exceeds power requirements of the loads. Various types of power sources are amenable to being replenished, including rechargeable batteries, regenerative fuel cells (including proton exchange membrane or polymer electrolyte membrane (PEM), high temperature PEM (HTPEM) and/or solid oxide regenerative type systems), and any other energy storage devices. When using the generator to regenerate the power sources, power may be supplied to the regenerative power sources gradually, such that the connections between the generator and the power sources can be configured to transmit relatively low amounts of energy per unit time.

The above described regeneration of the power sources is exemplified in FIG. 7 with respect to the operation of an aircraft incorporating a power distribution system constructed in accordance with an embodiment of the present invention and including rechargeable fuel cells and an engine-driven generator as power sources. As shown, the power demand of the various loads in the electrical distribution system of the aircraft also varies over time. Also time varying is the power produced by the operation of the aircraft engine, the amount of power depending on the flight status of the aircraft, i.e., whether the plane is taking off, climbing, landing, etc. Generally, this engine power may be used for propulsion of the plane and for providing, through the generator, power to the plane's network; the propulsion requirements are added to the electrical load in FIG. 7 to yield the "desired power available" curve and the propulsion power is equivalent to the "margin." However, at certain times in the course of a flight, namely at the beginning (start and taxi) and end (descent and taxi) of the flight, the power available from the engine is less than required for both propulsion and the load demands. At these times, the power produced by the engine is supplemented by discharging of the fuel cells. In the middle portion of a flight, while the plane is climbing and cruising, the power produced by the engine surpasses the aggregate requirements of propulsion and the loads. At these times, the excess engine power can be used to recharge the fuel cells. In this way, fuel cells are not required to have a capacity necessary to provide power for an entire flight, but only for part of the flight, say, the portion until recharging.

Referring to FIGS. 8-10, therein is shown another embodiment of a power distribution system 600 for a vehicle. The system 600 includes a network 602 of interconnected power sources 604 and a network 606 of interconnected electrical loads 608. The power sources 604 and/or loads 608 of the respective networks 602, 606 may be multiply interconnected, such that each power source 604 or load 608 may be connected to multiple other sources 604 and loads 608, respectively. The power source network 602 may be overlaid onto the load network 606, with electrical connections between the two networks 602, 606 at various points. As such, in some embodiments, sources 604 may be located proximally to loads 608. Further, in some embodiments, multiple power sources provide power to each load, possibly via any of several available electrical paths, such that failure of one power source may be compensated by other power sources. In another embodiment in which at least one power source is a storage device, the storage device may store energy during normal operation of the power distribution system and provide power sporadically to the system in response to a failure another power source of the system. It is noted that while the above system 600 has been described as having a network 602 of power sources 604 overlaid on a network 606 of loads 608, the two networks 602, 606 can also be interleaved in any way desired. Further, in some embodiments, the power source network 602 may connect to a network including both electrical loads and power sources.

As mentioned above, embodiments of the present invention may allow for increased efficiency of a power distribution system by moving power sources closer to the loads being supplied by those sources. When efficiency is increased, power production requirements are reduced, thereby reducing the costs associated with producing that power. However, there is an added benefit that may be experienced with some embodiments of the present invention. By moving power sources close to associated loads, power may be distributed non-uniformly within the power distribution system. In such cases, the distribution system can have non-homogeneous power ratings at different locations within the network, with relatively higher-power components used in limited regions, for example, close to loads, and relatively lower-power components utilized for the balance of the network. Such architecture may lead to added cost savings, for two reasons. First, components rated for lower power applications tend to be less expensive than those rated for higher power applications. Second, components rated for lower power applications tend to be smaller in size and weight than the high power counterparts, and therefore require less power to be carried on board an aircraft in flight. For example, for electrical power transmission, the diameter of the wires used to carry the electrical current often scale with the current magnitude, such that relatively thick (and heavy) wiring is required for carrying higher power and thin wires are used for carrying lower power. It is noted that what is termed "higher power" and "lower power" is defined with respect to other components in the vehicle at issue; these references are not made with respect to any inherent or external standards, although they may, in some instances, be in line with some conventional notions of high and low power for a specific application.

Many modifications and other embodiments of the invention will come to mind to one skilled in the art to which this invention pertains having the benefit of the teachings presented in the foregoing descriptions and the associated drawings. For example, while the previous embodiments have mainly illustrated power distribution systems in which loads were distributed throughout a vehicle body, embodiments of the present invention also contemplate use with systems in which loads are distributed throughout only a portion of the vehicle body. In the case of air vehicles with wings, loads may also be located in the wings in some cases, perhaps in relation to flight or navigation systems, or de-icing applications. Further, embodiments of the present invention are also applicable to power distribution systems that include multiple distribution sections that are isolated from one another. In some cases, it may be appropriate to separate a network into sections powered only by a generator and sections powered by other sources, perhaps in addition to a generator. In some embodiments, the network may include a means of power transmission other than wires, such as wave guides, which may transmit optical power. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A power distribution system for a vehicle comprising:
   a network including at least a first load and a second load; and
   at least a first and a second power source connected to said network, said first power source is located and connected proximal to the first load and said second power source is located distal from the first load, said second power source is located and connected proximal to the second load and said first power source is located distal from the second load; and
   said first power source is connected in series with the first and second loads.

2. A power distribution system for a vehicle comprising:
   a network including at least a first load and a second loads;
   at least a first and a second power source connected to said network, said first power source is located and connected proximal to the first load and said second power source is located distal from the first load, said second power source is located and connected proximal to the second load and said first power source is located distal from the second load; and
   a generator connected to said network distally from the first and second loads, said generator configured to supply power to at least one of the first and second loads.

3. A power distribution system according to claim 2, wherein said first and second power sources are configured to selectively supply at least some power to said network.

4. A power distribution system according to claim 2, wherein said first and second power sources are configured to be regenerated by said generator.

5. A power distribution system according to claim 2, wherein said generator is configured to selectively supply power to the first and second loads when power from at least one of said first and second power sources is less than respectively required by the first and second loads.

6. A power distribution system according to claim 2, wherein said generator is coupled to an engine of the vehicle, and at least one of said first and second power sources is configured to supply power to said engine.

7. A power distribution system for a vehicle comprising:
   a network including at least a first load and a second load; and
   at least a first and a second power source connected to said network, said first power source is located and connected proximal to the first load and said second power source is located distal from the first load, said second power source is located and connected proximal to the second load, and said first power source is located distal from the second load; and
   at least one of said first and second power sources is selected from the group consisting of: a generation device and a storage device.

8. A power distribution system according to claim 7, wherein the storage device selected from the group consisting of: a fuel cell, a battery, a capacitor, an ultra-capacitor, a turbine, a micro-turbine, and a flywheel.

9. A power distribution system according to claim 7, wherein the generation device is selected from the group consisting of: an electrical generator and one or more solar cells.

10. A power distribution system for a vehicle comprising:
    a network including at least first and second loads; and
    at least a first and a second power source connected to said network, said first power source is located proximal to the first load, said second power source is located proximal to the second load, and each of said first and second power sources is configured to supply power to the first and second loads, at least one of said first and second power sources is a storage device selected from the group consisting of: a fuel cell, a battery, a capacitor, an ultra-capacitor, a turbine, a micro-turbine, and a flywheel.

11. A power distribution system according to claim 10, wherein said network includes more highly power-rated components in areas configured for higher power transmission and more lowly power-rated components in areas configured for lower power transmission.

12. A power distribution system according to claim 10, wherein said network includes a plurality of loads, wherein said at least first and second power sources include a plurality of power sources interconnected to form a power source network, and wherein multiple electrical connections exist between said power source network and said network such that at least one load of the plurality of loads is configured to be supplied by multiple power sources.

13. A power distribution system according to claim 10, wherein each of said first and second power sources is configured to supply power in parallel to the first and second loads.

14. A power distribution system for a vehicle comprising:
    a network including at least first and second loads;
    at least a first and a second power source connected to said network, said first power source is located proximal to the first load, said second power source is located proximal to the second load, and each of said first and second power sources is configured to supply power to the first and second loads, and a generator connected to said network distally from the first and second load, said generator configured to supply power to at least one of the first and second loads.

15. A power distribution system according to claim 14, wherein said first and second power sources are configured to selectively supply at least some power to said network.

16. A power distribution system according to claim 14, wherein said first and second power sources are configured to be regenerated by said generator.

17. A power distribution system according to claim 14, wherein said generator is configured to selectively supply power to the first and second loads when power from at least one of said first and second power sources is less than respectively required by the first and second loads.

18. A power distribution system according to claim 14, wherein said generator is coupled to an engine of the vehicle, and at least one of said first and second power sources is configured to supply power to said engine.

19. An air vehicle comprising:
   an air vehicle structure including an elongated body and at least one wing extending laterally from the body;
   a network for distributing power within at least part of the body, said network including one or more loads distributed within the body; and
   one or more power sources located in the body and connected to said network for supplying multiple of the loads and at least one of said power sources is a storage device selected from the group consisting of: a fuel cell, a battery, a capacitor, an ultra-capacitor, a turbine, a micro-turbine, and a flywheel.

20. An air vehicle according to claim 19, wherein said network includes more highly power-rated components in areas configured for higher power transmission and more lowly power-rated components in areas configured for lower power transmission.

21. A air vehicle according to claim 19, wherein said network includes a plurality of loads, wherein said one or more power sources include a plurality of power sources interconnected to form a power source network, and wherein multiple electrical connections exist between said power source network and said network such that at least one load of the plurality of loads is configured to be supplied by multiple power sources.

22. An air vehicle according to claim 19, further comprising at least one generation device coupled to and located in an area of the wing and connected to said network.

23. An air vehicle according to claim 22, wherein at least some of said sources are configured to be regenerated by said generation device.

* * * * *